(12) United States Patent
Sigal et al.

(10) Patent No.: US 8,051,019 B2
(45) Date of Patent: Nov. 1, 2011

(54) NEURAL NETWORK RESOURCE SIZING APPARATUS FOR DATABASE APPLICATIONS

(75) Inventors: Lev Sigal, Karmiel (IL); Shai Ziv, Kiriat Hayim (IL)

(73) Assignee: SAP AG, Walldorf (DE)

( * ) Notice: Subject to any disclaimer, the term of this patent is extended or adjusted under 35 U.S.C. 154(b) by 427 days.

(21) Appl. No.: 11/486,428

(22) Filed: Jul. 13, 2006

(65) Prior Publication Data

US 2008/0016014 A1    Jan. 17, 2008

(51) Int. Cl.
*G06E 1/00* (2006.01)
(52) U.S. Cl. ............................ 706/21; 709/226; 713/100
(58) Field of Classification Search ................... 706/21; 709/226; 713/100
See application file for complete search history.

(56) References Cited

U.S. PATENT DOCUMENTS

| | | | | | |
|---|---|---|---|---|---|
| 5,299,284 | A | * | 3/1994 | Roy | 706/20 |
| 5,398,300 | A | * | 3/1995 | Levey | 706/16 |
| 5,704,012 | A | * | 12/1997 | Bigus | 706/19 |
| 2002/0152305 | A1 | * | 10/2002 | Jackson et al. | 709/224 |
| 2002/0194251 | A1 | * | 12/2002 | Richter et al. | 709/105 |
| 2004/0177245 | A1 | * | 9/2004 | Murphy | 713/100 |
| 2005/0027661 | A1 | * | 2/2005 | Lober et al. | 705/400 |

OTHER PUBLICATIONS

Kevin Gurney ("An introduction to neural networks" 1997) only cover, pp. 14, 44-45 are included.*
Exsys ("Online Advice System Helps Drive Hewlett Packard E-Business Strategy" 2000).*
Dustin Huntington ("Expert systems for online advice knowledge at your fingertips" Aug. 2000).*
Hagan et al ("Neural Network design" 2002, ISBN: 0-9717321-0-8).*
Mathworks, "MathWorks Tools used to predict financial crises in emerging markets" 2000. 2 pgs total.*
IEEE dictionary, seventh edition, 2 pages only.*
Chapelfiled Systems ltd "White Paper The Route to Success" 2003.*

* cited by examiner

*Primary Examiner* — Jeffrey A Gaffin
*Assistant Examiner* — Lut Wong
(74) *Attorney, Agent, or Firm* — Buckley, Maschoff & Talwalker LLC (57) ABSTRACT

A neural network resource sizing apparatus for database applications. Through use of multiple database application metrics input into a neural network learning algorithm, recommended resource capacities are generated. Input parameters such as the number of records, lookups, images, PDFs, fields, BLOBs and width of fields for example may be utilized to train a neural network to yield needed resource metrics such as the processing power, memory, disk and/or network capacities required to run the database application. Training for the neural network may involve running tests over all desired cross interactions of input and output parameters beginning for example with a small repository and ending with the maximum complexity of data and schema test. The training data is input into the neural network for the given database application version and utilized to plan resource utilization. A portal or webservice may be utilized to provide an interface to the apparatus.

16 Claims, 10 Drawing Sheets

$a^1 = \text{hardlim}(IW_{1,1}p^1 + b^1)$

Where...

$R$ = number of elements in Input $S1$ = number of neurons in layer 1

Figure 3

The Perceptron Learning Rule

$$\mathbf{W}^{new} = \mathbf{W}^{old} + \mathbf{e}\mathbf{p}^T$$

$$\mathbf{b}^{new} = \mathbf{b}^{old} + \mathbf{e}$$

where $$\mathbf{e} = \mathbf{t} - \mathbf{a}$$

Figure 4

$$W = \begin{bmatrix} w_{1,1} & w_{1,2} & \cdots & w_{1,R} \\ w_{2,1} & w_{2,2} & \cdots & w_{2,R} \\ & & & \\ w_{S,1} & w_{S,2} & \cdots & w_{S,R} \end{bmatrix}$$

| Record No. | Manufacturer | Category | Description | Att | Price | Model | PDF |
|---|---|---|---|---|---|---|---|
| 1 | ACME | Laser | 15 ppm printer | 5 | $250 | 63773 | 1z4.pdf |
| ⋮ | ⋮ | ⋮ | ⋮ | ⋮ | ⋮ | ⋮ | ⋮ |
| 100,000 | SUPER_P | LaserJ | 50 ppm printe | 3 | $875 | 1523L | SA1.pdf |

801

| Category | Att |
|---|---|
| Laser | 5 |
| LaserJ | 3 |

802

| Att Name | Att | Type |
|---|---|---|
| PPM | 5 | Numeric |
| Color | 3 | Text |

```
<?xml version="1.0"?>
<DBparameter>
    <NumberOfRecords>
        100,000
    </NumberOfRecords>
    <NumberOfLookups>
        3,000
    </NumberOfLookups>
    <NumberOfImages>
        18,000
    </NumberOfImages>
    <NumberOfPDFFiles>
        1,000
    </NumberOfPDFFiles>
    <NumberOfBLOBs>
        2,000
    </NumberOfBLOBs>
    <NumberOfFields>
        150
    </NumberOfFields>
</DBparameter>
```

1001

```
<?xml version="1.0"?>
<RecommendedCapacity>
    <CPU>
        47 Dhrystone
    </CPU>
    <RAM>
        8 Gb
    </RAM>
    <DISK>
        42 Gb
    </DISK>
    <NETWORK>
        2 Gb/sec
    </NETWORK>
    <SERVER>
        E6900
    </SERVER>
</RecommendedCapacity>
```

NEURAL NETWORK RESOURCE SIZING APPARATUS FOR DATABASE APPLICATIONS

BACKGROUND OF THE INVENTION

1. Field of the Invention

Embodiments of the invention described herein pertain to the field of computer systems. More particularly, but not by way of limitation, one or more embodiments of the invention enable a neural network resource sizing apparatus for database applications.

2. Description of the Related Art

There are a number of requirements and/or preferences associated with determining the type of resources, e.g., hardware required to host a particular database application. Implementers and planners generally perform trial and error methods when estimating the processing power, memory and disk resources required to host a given database application. Customers require that hardware is in line with the requirements of the database application. There is no reason for a cluster of super computers to run a given database application if the database application does not require these expensive computing resources. On the other hand, if the computing resources are not of sufficient capacity, then the system will lose performance and may actually fail. For many customers this is unacceptable. The database application implementers are generally not trained in the art of accurately estimating hardware resources and at times over estimate the resources in order to ensure that the database application never fails. This overestimation strategy is not a minimal cost strategy and customers pay more for a given installation than they should in general.

Current methodologies for sizing a given database application do not take into consideration a range of variables such as the number of records, lookups, images, PDF files, BLOBs and the widths of the fields for example. Generally, sizing may be performed by looking at the number of users that will access a system or some other indirect parameter that is not related to the internal metrics of the database application. This results in resource allocation that is not optimized for the database application in use, but is rather a crude, indirect and external guess at the resources that may be needed. Some database application providers furnish their customers with sizing guides which provide static rules that may or may not cover the specific installation at hand. This type of solution is slow to adapt to new observed installation utilization figures since the results must be sent back to the company and incorporated in a new version of the sizing guide. The round trip time for delivering new sizing guides to customers based on feedback is long. Companies involved with developing database applications may alter the application software over time which also may render the sizing guides obsolete. This may happen in one of two ways since the software may become more efficient and may then require fewer resources for operation, or alternatively, may become more "feature rich" which tends to require more resources to operate. Either way, the software changes provide a moving target for the implementers that are responsible for planning resource allocation with the customers. Again, the implementers may overestimate the required hardware resources so that their software application(s) appear to be fast and robust. The separation of software implementers from hardware suppliers thus tends to lead to an inefficiency in the corporate world that costs companies great sums of capital.

Attempts at calculating required resources based on traditional linear methods of correlating input parameters with required resources generally do not work since small variations of one input parameter may drastically change the required resources. For example, existing methods that utilize tables or linear regression do not incorporate learning methods. As such, these solutions are limited in the complexity that they can handle and are hence inaccurate for real world database applications that have many parameters that may be unique to each installation.

For at least the limitations described above there is a need for a neural network resource sizing apparatus for database applications.

BRIEF SUMMARY OF THE INVENTION

One or more embodiments of the invention enable a neural network resource sizing apparatus for database applications. Through use of multiple inputs such as database application parameters input into a neural network learning algorithm, resource output results are generated. Database application parameters are any element related to a database schema, installation, architecture, implementation or version or any other characteristic associated with a particular database instance. Database application parameters for example are the number of records, lookups, images, PDFs, fields, BLOBs and width of fields, or parameters related to the installation of the database for example the amount of memory allocated for certain tables, or whether the database is configured for a multi-threading architecture, or whether the database implements or is implemented in a particular manner or the exact version of the database. Database application parameters for example may be utilized to train a neural network to yield needed resource output results such as the processing power, memory, disk and/or network capacities required to run the database application. Training in one or more embodiments of the invention may be programmatically accomplished without human intervention. Resource output results are any measurement of system resources or performance or any other metric that impacts or quantifies system performance. By measuring resource output results for a number of differing database application parameters and training a neural network, recommended resource output results allow for recommended resource purchases for example.

Training the neural network may be accomplished in many ways and may utilize existing database application parameters and observed resource output results measured at working installations to produce recommended resource output results. For example, an installation where a database application is using 100,000 records and 10,000 images for example may have an average processing utilization e.g., CPU utilization of 50% for a 4 way CPU cluster of 3 GHz each with 8 Gb of RAM. By extracting performance information over many installations and feeding the observed parameters and utilization percentages for the given resources into the neural network, a neural network may hence be trained for accurately recommending resource planning and purchasing.

One or more embodiments of the invention enable a neural network resource sizing apparatus for database applications. Through use of multiple inputs such as database application parameters input into a neural network learning algorithm, resource output results are generated. Database application parameters are any element related to a database schema, installation, architecture, implementation or version or any other characteristic associated with a particular database instance. Database application parameters for example are the number of records, lookups, images, PDFs, fields, BLOBs and width of fields, or parameters related to the installation of the database for example the amount of memory allocated for certain tables, or whether the database is configured for a multi-threading architecture, or whether the database implements or is implemented in a particular manner or the exact version of the database. Database application parameters for example may be utilized to train a neural network to yield needed resource output results such as the processing power, memory, disk and/or network capacities required to run the database application. Training in one or more embodiments of the invention may be programmatically accomplished without human intervention. Resource output results are any measurement of system resources or performance or any other metric that impacts or quantifies system performance. By measuring resource output results for a number of differing database application parameters and training a neural network, recommended resource output results allow for recommended resource purchases for example. In one or more embodiments, a neural network resource sizing computer program product comprises computer readable instruction code executing in a tangible memory medium of a computer.

In one or more embodiments of the invention, a perceptron neural network may be utilized. Any type of neural network may be utilized in other embodiments of the invention and the exemplary description herein with respect to perceptron networks is non-limiting. Perceptron networks are the simplest kind of feedforward neural network and these types of neural networks are a type of linear classifier. Perceptron networks are one of the fastest types of classifiers. Any other type of neural network may be utilized in place of the perceptron network that is described herein. Perceptrons are trained by inputting a set of examples and desired outputs. Corrections to the weight vectors are made each time a mistake occurs. This results in learning by example. If the training set is not linearly separable, then this type of training does not converge. Multilayer perceptrons may be utilized in these circumstances in embodiments of the invention where more complex relations exist. The perceptron learning algorithm in a multilayer perceptron embodiment may use a voted formulation of the perceptron learning algorithm. In this manner embodiments of the invention can handle nonlinearly separable data.

Embodiments of the invention may be utilized for example to further aide in load balancing and may also generate a report detailing the maximum complexity that the recommended resources, e.g., the resource output results will be able to accommodate. Any type of resource output result based on database application parameters applied to a neural network is in keeping with the spirit of the invention.

In one or more embodiments of the invention a website portal may be utilized to field requests for sizing recommendations. The various input parameters such as database application parameters may be gathered and passed to the portal for example in order to obtain the recommended resource output results for a given database application installation. For example, the number and speed of central processing units, the amount of random access memory and amount of disk and/or speed of network recommended for a desired database application may be provided by embodiments of the invention.

BRIEF DESCRIPTION OF THE DRAWINGS

The above and other aspects, features and advantages of the invention will be more apparent from the following more particular description thereof, presented in conjunction with the following drawings wherein:

FIG. 1 shows a graphical representation of a perceptron showing inputs p1 through pR input to the perceptron layer that yields resource utilization outputs a1 through aS.

DETAILED DESCRIPTION

A neural network resource sizing apparatus for database applications will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
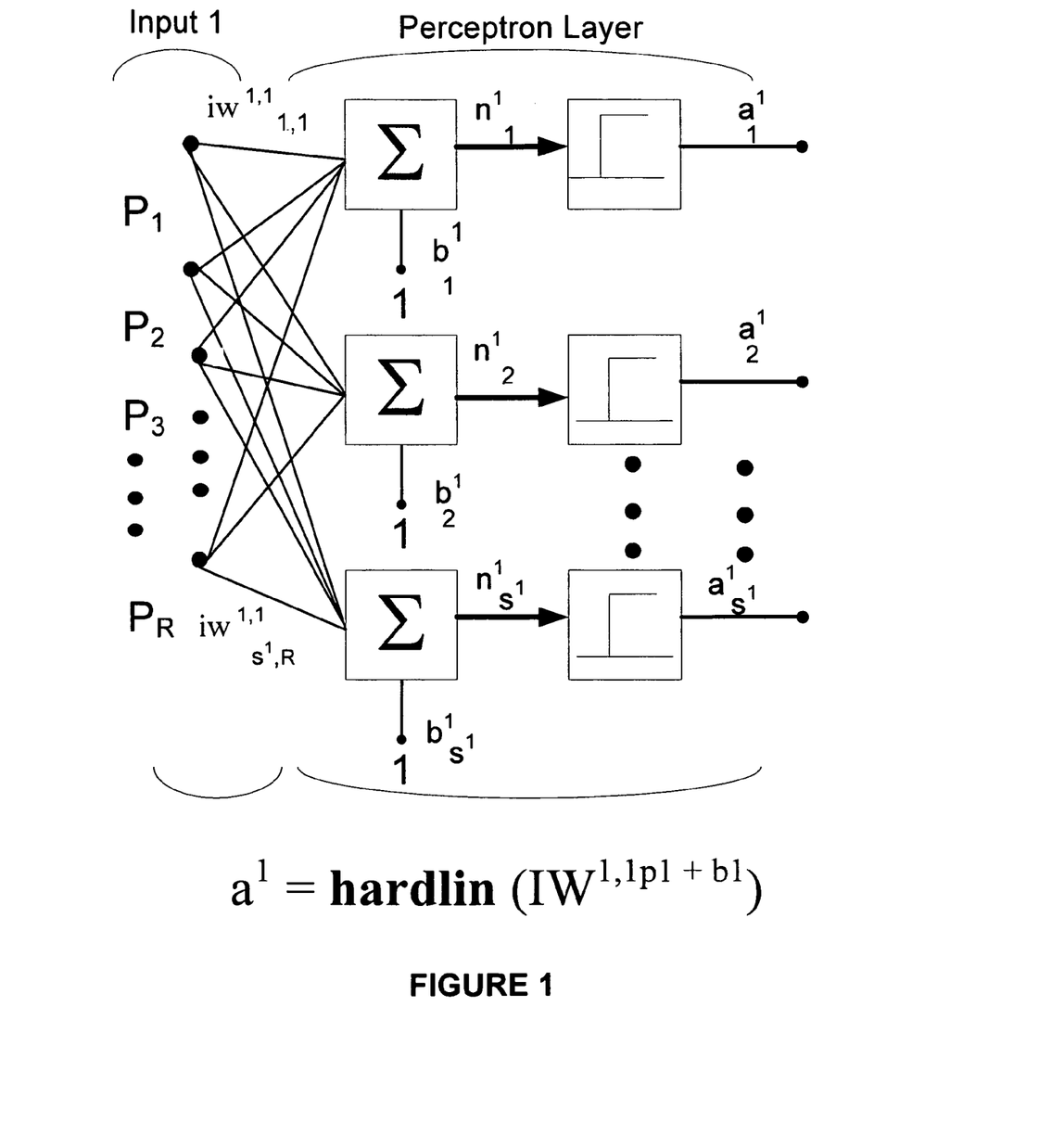

FIG. 1 shows a graphical representation of a perceptron showing inputs p1 through pR input to the perceptron layer that yields resource utilization outputs a1 through aS. Inputs p1 through pR may be configured as follows in one embodiment of the invention:

p1=number of records
p2=number of lookups
p3=number of images
p4=number of PDF files
p5=number of fields
p6=number of BLOBs
p7=width of all fields Outputs from Perceptron Layer may be as follows in one embodiment of the invention:

a1=amount of recommended processing power in a desired benchmark (SPEC, Dhrystone, etc.)
a2=amount of recommended memory
a3=amount of recommended disk
a4=amount of recommended network throughput Each neuron in the Perceptron Layer is represented as a summation symbol followed by a hardlim, i.e., hard-limit transfer function. The hardlim transfer function returns a zero or one. The perceptron neuron produces a zero if the net input into the hardlim transfer function is less than zero, or a one if the net input to the hardlim transfer function is equal to or greater than zero. The hardlim transfer function allows the perceptron neuron to split the input space into two regions. The weighting matrix W is correlates the weights of each input against each neuron. By applying multiple vectors of inputs and recommended outputs to the neural network, the neural network is trained to output recommended resource capacities for a given database application version.

Figure 2:
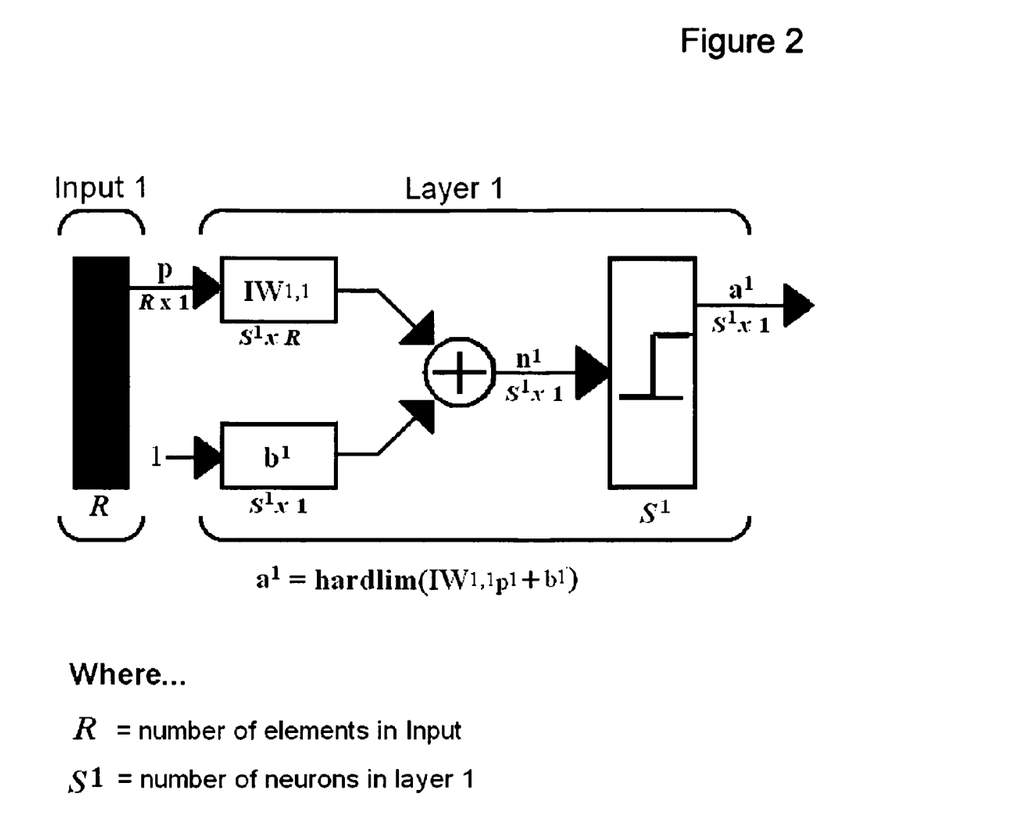
FIG. 2 is an equivalent view of FIG. 1 using different neural network notation.

FIG. 2 is an equivalent view of FIG. 1 using different neural network notation. In this diagram Input is shown as a bar to indicate that it is a vector of size R. Regardless of the notation used, the inputs, outputs and training are the same.

Figure 3:
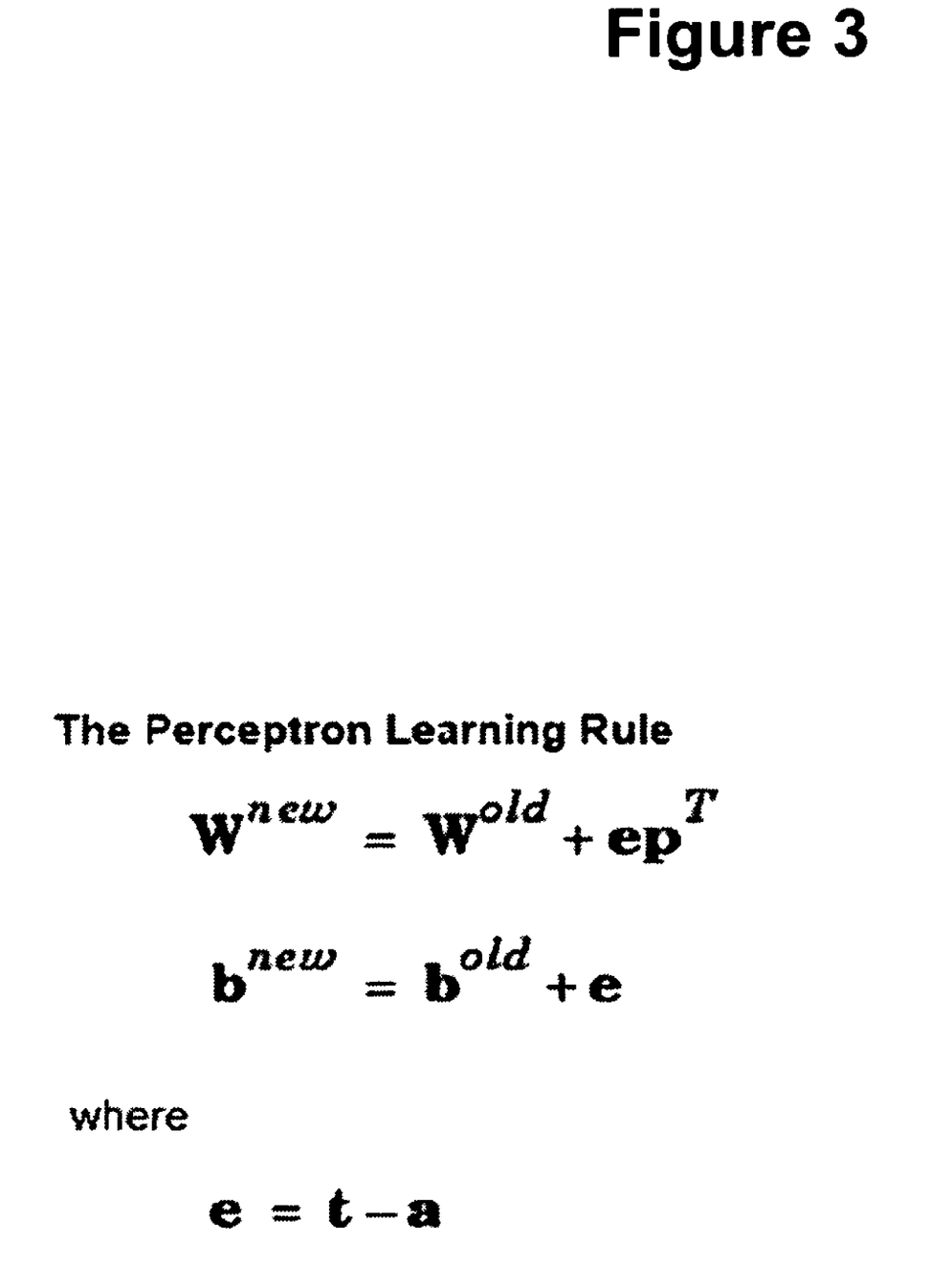
FIG. 3 shows the perceptron learning rule formulas.

FIG. 3 shows the perceptron learning rule formulas. The goal of training the perceptron is to minimize the error "e" which is the difference between the target vector "t" and the neuron response vector "a". By altering the weights in weight vector W based on the input vector "p", the new weight vector w(new) is calculated from w(old) and error "e" and input vector "p". For example if an input vector is presented and the output is correct, then the weight vector "w" is not altered. If the neuron output is zero and should be one, "a" is zero, "t" is one and hence "e"="t"−"a"=1, then input vector "p" is added to the weight vector "w". If the neuron output is one and should be zero, then the input vector "p" is subtracted from the weight vector "w". Similarly, the bias can also be updated based on the error "e". One skilled in the art of neural networks will understand that many tools or different types of calculations may be performed to produce an updated weighting matrix W.

Figure 4:
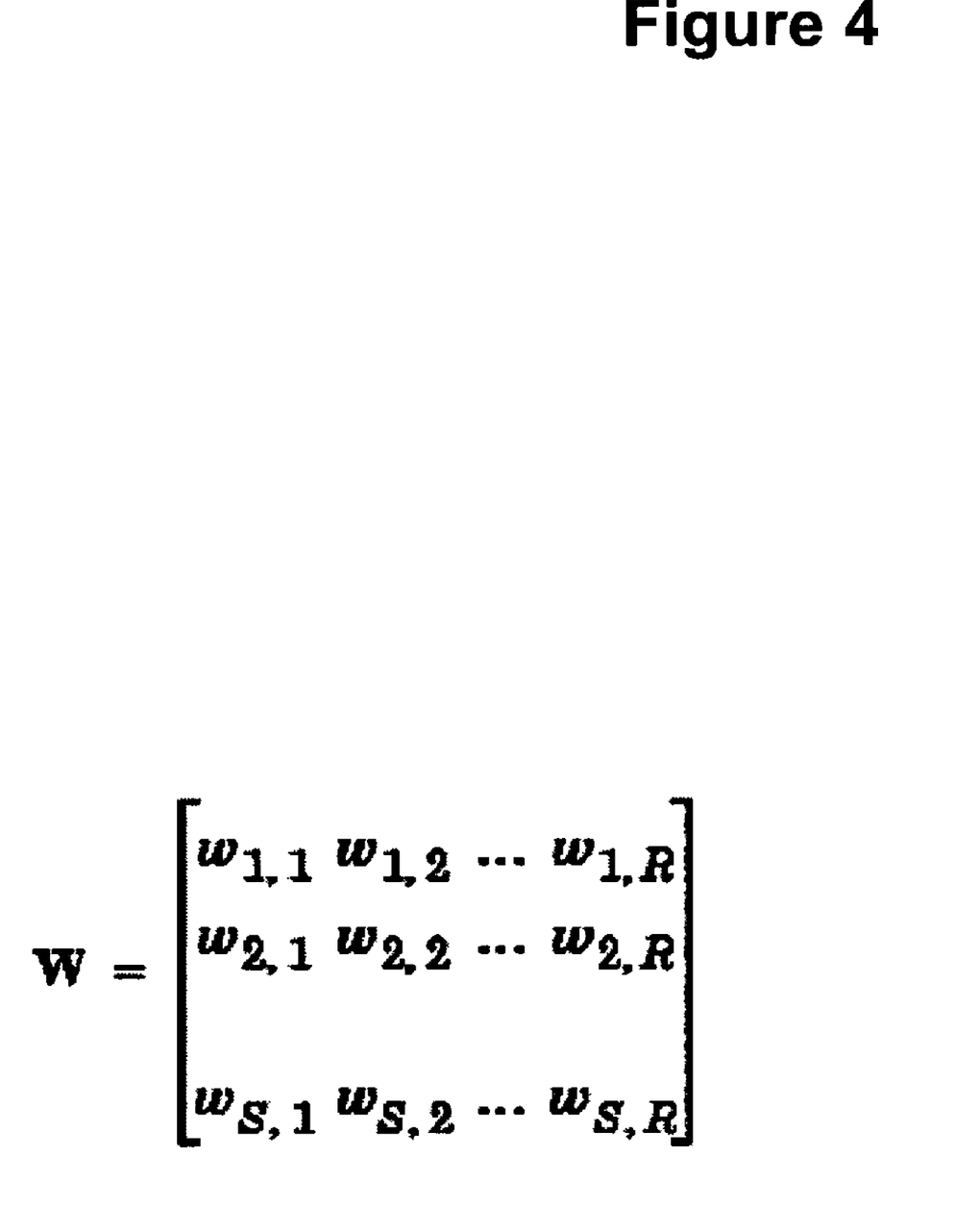
FIG. 4 shows the weighting matrix W having row indices associated with the destination neuron and column indices associated with the given input.

FIG. 4 shows the weighting matrix W having row indices associated with the destination neuron and column indices associated with the given input. The weighting matrix W comprises the various weight vectors and is updated as more and more test data is used to train the system. In this manner, the neural network may be utilized to recommend resource capacities for database application implementations not yet observed. Any updated training information based on existing installations may also be applied to the neural network to further improve the accuracy of the apparatus. Anyhow known software package may be utilized to implement the neural network such as for example MATHMATICA®.

Figure 5:
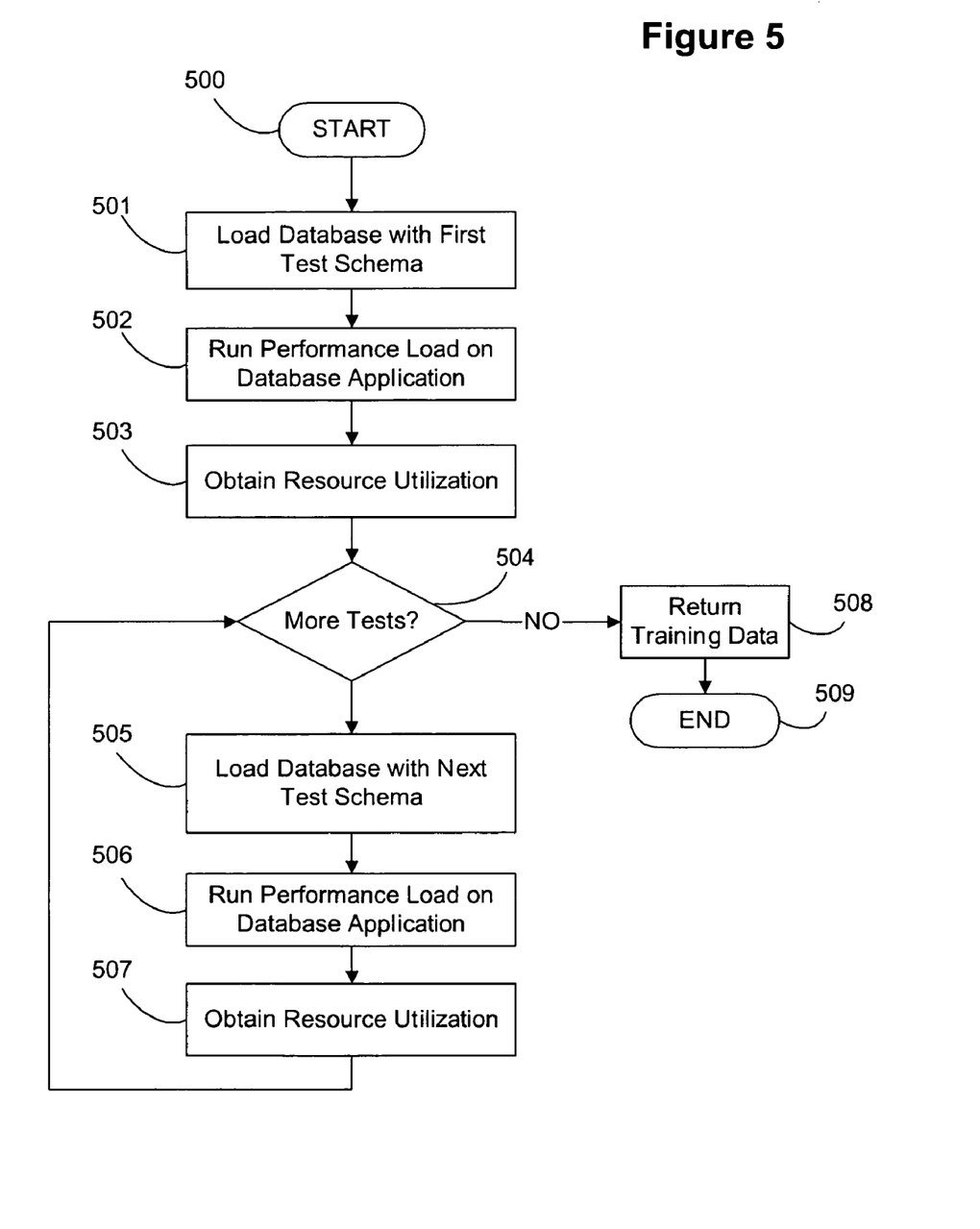
FIG. 5 shows a flowchart detailing a method for obtaining training data.

FIG. 5 shows a flowchart detailing a method for obtaining training data. Processing starts at 500. The database is loaded with a first test schema. The order in which test schemas are loaded and utilized to obtain training data does not matter and the input of simple schemas before more complex schemas is exemplary only. A performance load is run on the database application at 502. There are many tools that may be utilized in order to simulate a load on the database application. The resulting utilization of CPU, RAM, disk and/or network resources is obtained at 503. If there are no more tests to run as determined at 504, then training data is returned at 508 and processing completes at 509. If there are more tests to run as determined at 504, then the database is loaded with the next test schema at 505. A performance load is placed on the database application with the new test schema at 506. The resulting utilization of CPU, RAM, disk and/or network resources is obtained at 507. If there are more tests to run at 504, then another schema is loaded and tested otherwise the training data is returned at 508 and processing ends at 509. By obtaining a number of resource output results for different database application parameter scenarios, accurate recommended resource output results may be provided.

Figure 6:
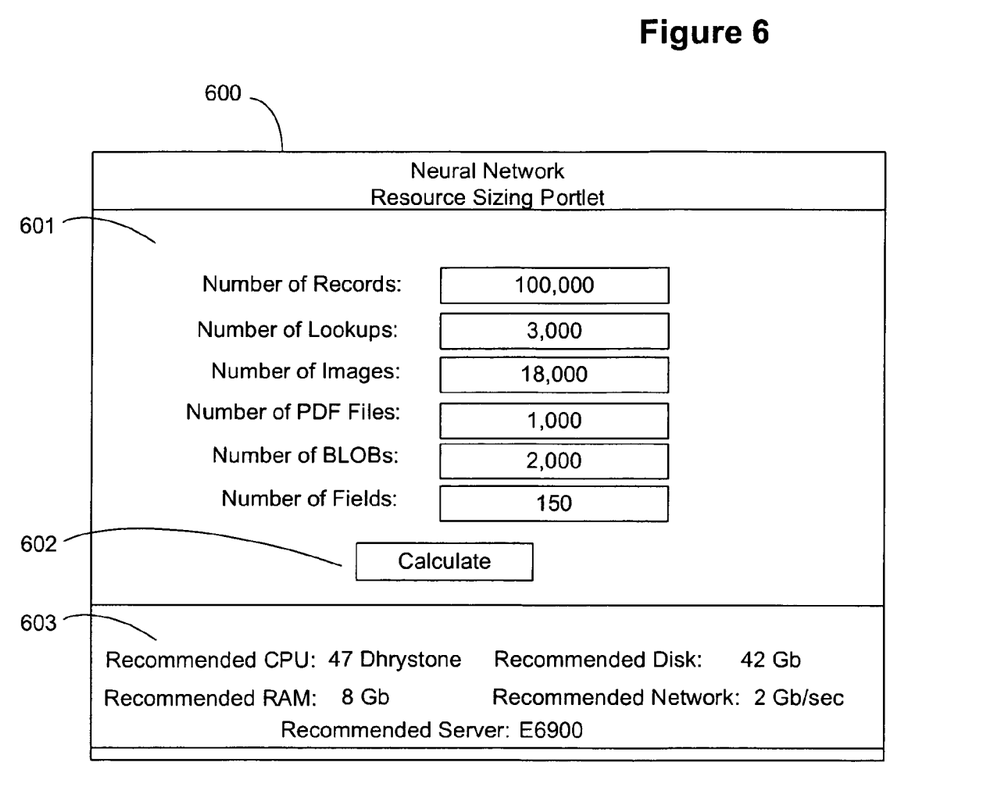
FIG. 6 shows a portal interface to an embodiment of the apparatus.

FIG. 6 shows a portal interface to an embodiment of the apparatus. In this figure portlet 600 is shown that may be embedded in another webpage for example. In other embodiments of the invention, a webservice may be utilized in addition to, or in place of the graphical user interface shown in FIG. 6. In this embodiment of the portlet, the user inputs database application parameters such as for example the number of records, number of lookups, number of images, number of PDF files, number of BLOBs and number of fields in the database for the given schema in input area 601. Calculate button 602 is pressed and recommended resource output results are shown in recommended resource output results area 603. Optionally, recommended servers or hardware products that meet the required capacities may be shown. A recommended server may be shown either if the recommended resources capacities are within the bounds of the recommended server for example.

Webservice embodiments may be utilized for example that allow for a given database application implementation to routinely report utilization numbers that occur over time. These reports may be used over time to increase the accuracy of the neural network or to flag problems. For example if a particular installation appears to be losing ground in resource utilization with respect to the planned resources, then this may indicate that there are problems with the system such as hardware problems or over utilized resources which limit the amount of resources that a particular installation may utilize. For example, if the amount of disk for a given installation drops and the number of main data records rises, then the amount of RAM utilized may result in swapping or thrashing. This information may be utilized to not only update the neural network, but also to alert support personnel that there may be a problem.

Figure 7:
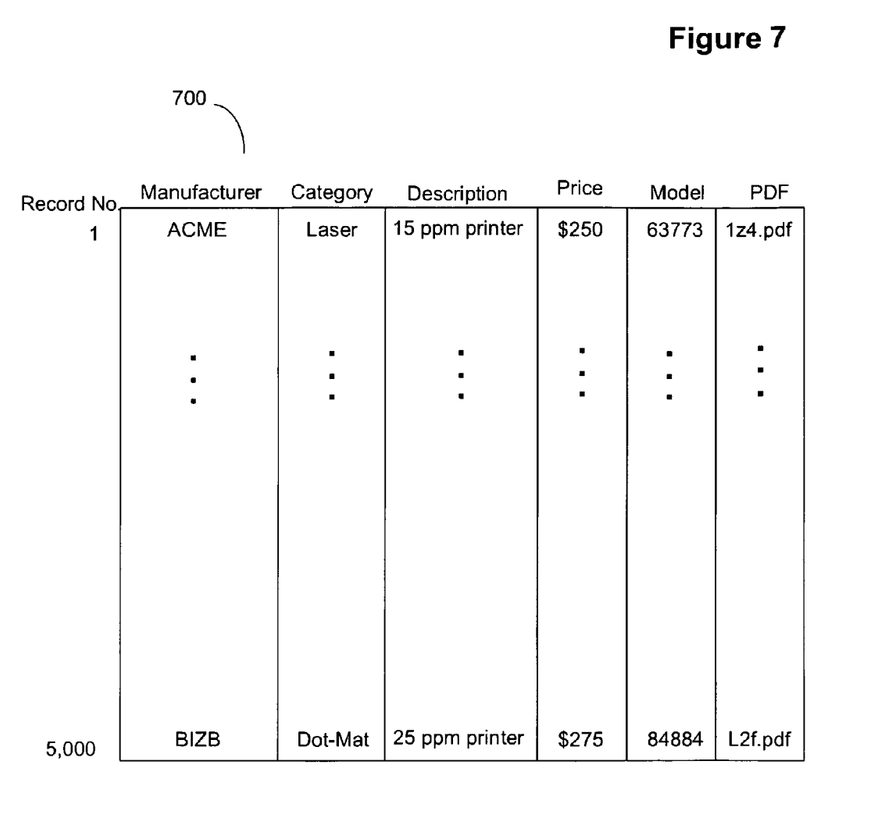
FIG. 7 shows a first test schema for generating a resource learning session.

FIG. 7 shows a first test schema for generating a resource learning session. Test schema 700 utilizes a main data table without lookups and with 5000 product records. The database application may make use of family based data which builds upon an existing hierarchy of manufacturer and category however this is optional. The number of PDF files in the 5000 data records is known and is used as an input for training for this test schema. A load module is run against the schema that defines the database application parameters and resource utilization is recorded such as CPU, RAM, disk and/or the network as resource output results. The database application parameters and resource output results (or resource output results rounded up to the meet hardware capable of handling the load for example) are saved and input to the neural network for training the neural network. Any factor for increasing the resource output results to add a safety margin is in keeping with the spirit of the invention.

Figure 8:
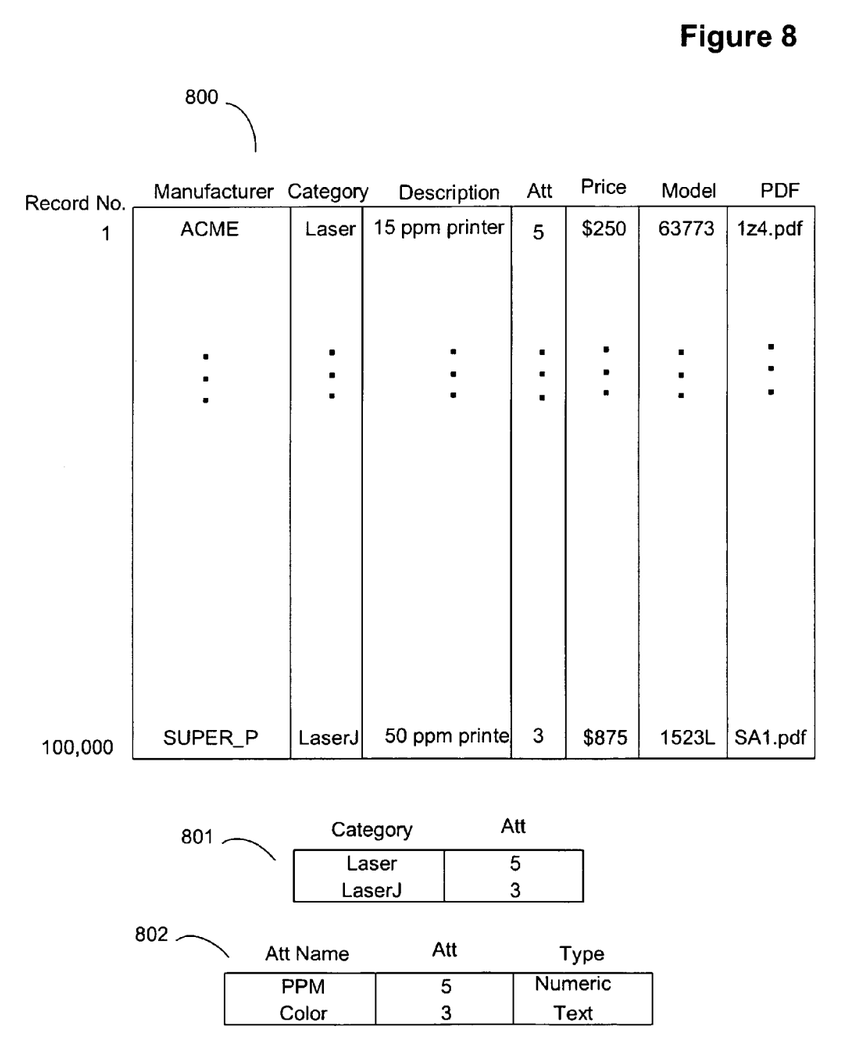
FIG. 8 shows a second test schema for generating a resource learning session.

FIG. 8 shows a second test schema for generating a resource learning session. Test schema 800 also includes lookups based on attributes that are associated in the main table with a category as per category-attribute table 801. The attribute names and types are shown in attributes table 802. The main data table in this case utilizes 100,000 records and may have a variety of loads place on the database application in order to generate one or more performance points for use in training the neural network. Generally, the more training that can be applied to the neural network over varying parameters, the more accurate the resulting recommended resource output results become. Although the example shown in FIG. 8 is simplified for brevity, any number of fields, BLOBs and field widths may be utilized for example in order to provide an array of various tests for a particular database application implementation and given hardware setup.

Figure 9:
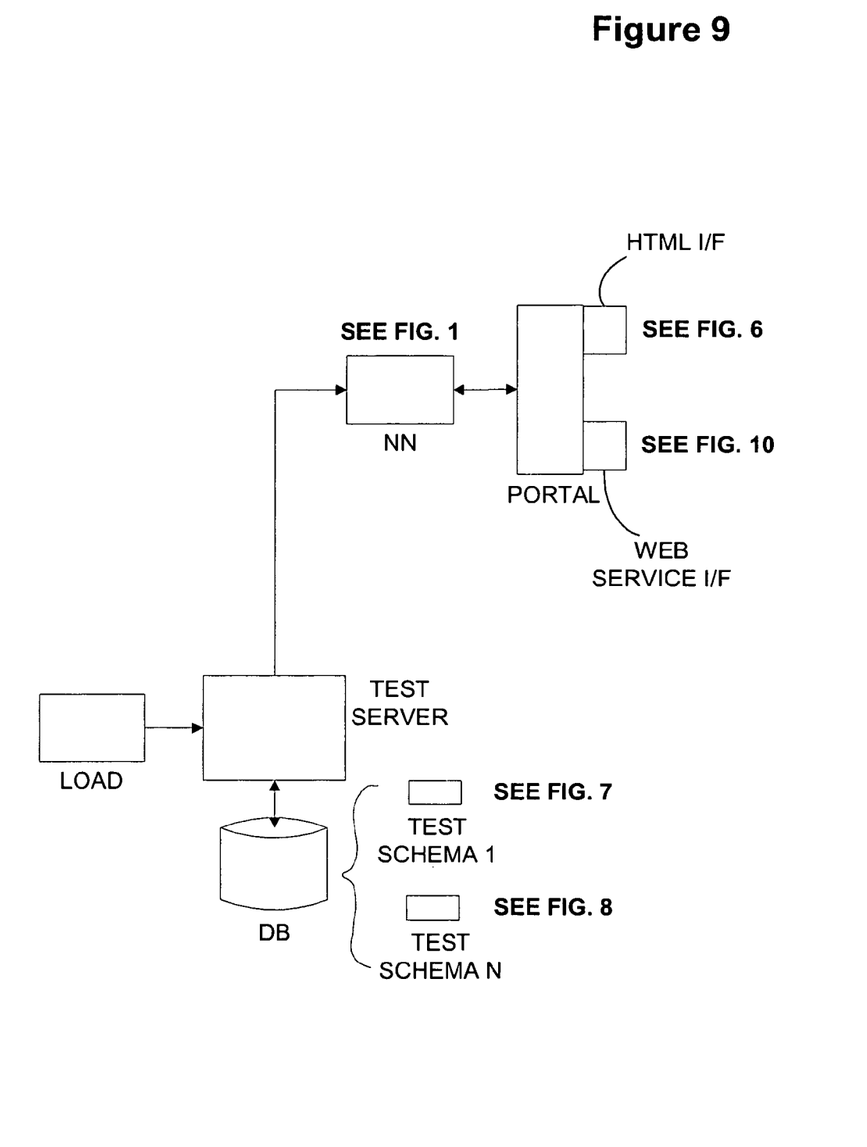
FIG. 9 shows an architectural diagram having a test server for training the neural net and also a portal with an HTML interface and a webservice interface utilizing XML.

FIG. 9 shows an architectural diagram having a test server for training the neural net and also a portal with an HTML interface and a webservice interface utilizing XML. Load tester LOAD interfaces with server TEST SERVER associated with database DB. Server TEST SERVER utilizes test schemas 1 through N as inputs for a test. The apparatus obtains the database application parameters associated with each database schema, installation, implementation, version or any other database related element and along with the load test results that result from running load tester LOAD. TEST SERVER or any other computing element coupled with the apparatus then trains neural net NN with these database application parameters and resource output result parameters. When a user of the apparatus desires recommendations for a desired database application, the apparatus obtains the desired database application parameters and provides at least one recommended resource output result based on neural network NN as trained. The interface to the apparatus may include HTML via portal interface HTML or portal interface WEBSERVICE. Any other method of training neural network NN is in keeping with the spirit of the invention so long as database application parameters are utilized in training neural network NN to provide recommended resource output results. (See FIG. 6 for an HTML embodiment of the portal interface HTML).

Figure 10:
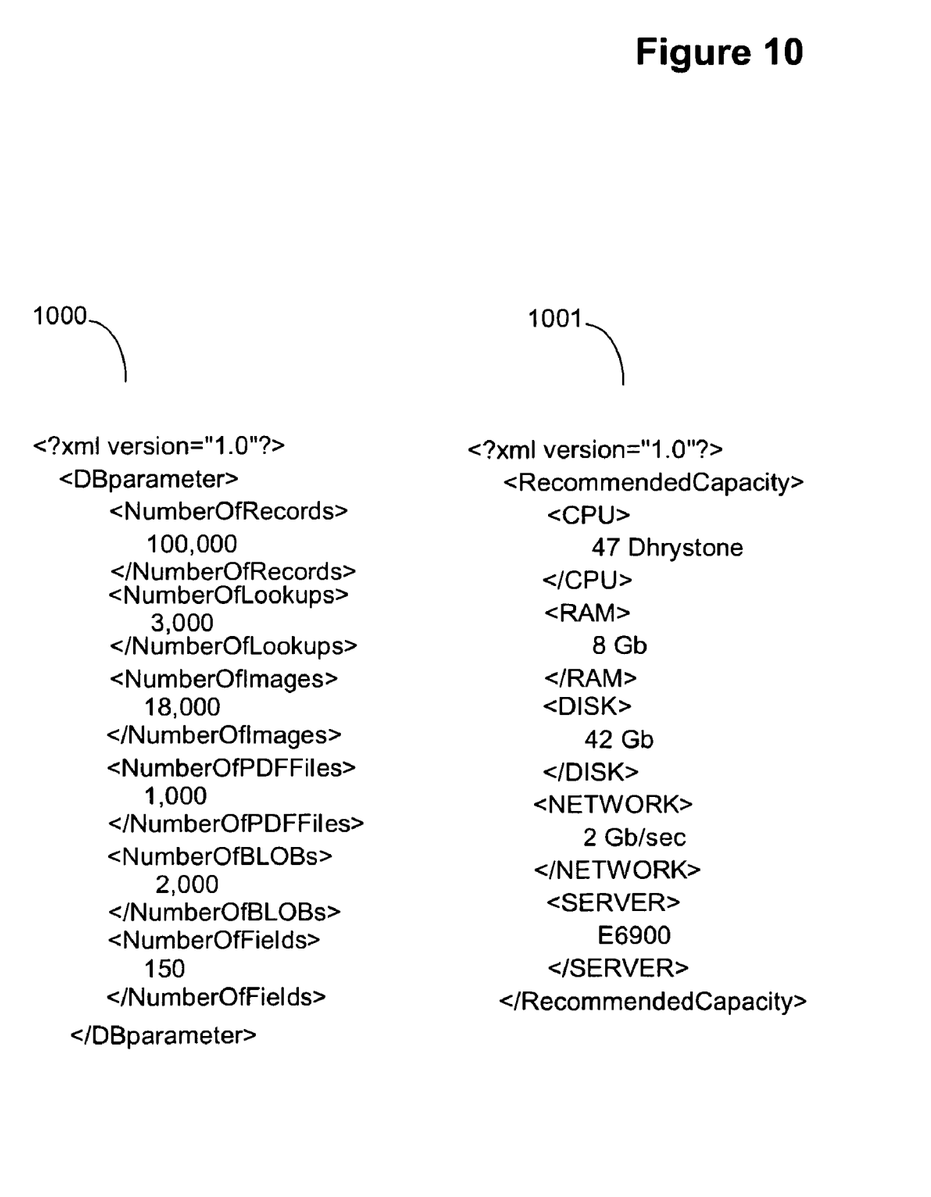
FIG. 10 shows an embodiment of the XML input and output used by the webservice interface.

FIG. 10 shows an embodiment of the XML input and output used by the webservice interface. XML input message 1000 shows elements associated with database parameters residing within element designated DBparameter. The various database application parameters used follow and include NumberOfRecords, NumberOfLookups, NumberOfImages, NumberOfPDFFiles, NumberOfBLOBS and NumberOfFields along with the associated values. XML output message from the webservice includes elements associated with recommended resource capacities residing in element RecommendedCapacity. The various recommended capacity elements used follow and include CPU, RAM, DISK, NETWORK and SERVER. Any variation of the database application parameters and recommended resource output results is in keeping with the spirit of the invention and those shown in FIG. 10 are exemplary.

While the invention herein disclosed has been described by means of specific embodiments and applications thereof, numerous modifications and variations could be made thereto by those skilled in the art without departing from the scope of the invention set forth in the claims.

What is claimed is:

1. A non-transitory, computer-readable medium storing program code executable by a computer to perform a method, said method comprising:
   initiating, by a test server, a neural network configured to recommend resource purchases for a desired installation;
   automatically generating, by the test server, a plurality of resource output results, wherein each resource output result is generated by automatically loading a test database application with a test schema and automatically running a performance load on said test database application loaded with said test schema;
   automatically modifying, by the test server, said neural network by training said neural network using said plurality of resource output results as training data;
   automatically obtaining, by the test server, at least one database application parameter for said desired installation, wherein the test server is able to process multiple types of database application parameters including all of: a number of database records, a number of database lookups, a number of images in a database, a number of BLOBs, a number of PDF files stored in a database, a number of database fields, and a width of a plurality of database fields; and
   automatically obtaining, by the test server, at least one recommended resource output result from said neural network based on said at least one database application parameter, wherein said at least one recommended resource output result is a recommended resource purchase for said desired installation.

2. A non-transitory, computer-readable medium storing program code executable by a computer to perform a method, said method comprising:
   preparing, by a test server, a neural network in an initial state, wherein said neural network is configured to recommend resource purchases for a desired installation;
   automatically generating, by the test server, a first training performance point comprising resource utilization information, wherein said first training performance point is generated by automatically loading a test database application with a first test schema and automatically running a first performance load on said test database application load with said first test schema;
   automatically generating, by the test server, a second training performance point comprising resource utilization information, wherein said second training performance point is generated by automatically loading a test database application with a second test schema and automatically running a second performance load on said test database application load with said second test schema;
   automatically modifying, by the test server, said neural network by training said neural network using said first training performance point and said second training performance point;
   automatically obtaining, by the test server, at least one database application parameter for said desired installation, wherein the test server is able to process multiple types of database application parameters including all of: a number of database records, a number of database lookups, a number of images in a database, a number of BLOBs, a number of PDF files stored in a database, a number of database fields, and a width of a plurality of database fields; and
   automatically obtaining, by the test server, at least one recommended resource output result from said neural network based on said at least one database application parameter, wherein said at least one recommended resource output result is a recommended resource purchase for said desired installation.

3. The medium of claim 2 wherein said first performance point and said second performance point each comprise a central processing unit benchmark number and unit of measure associated with database computer hardware.

4. The medium of claim 2 wherein said first performance point and said second performance point each comprise an amount of random access memory associated with database computer hardware.

5. The medium of claim 2 wherein said first performance point and said second performance point each comprise an amount of disk storage space for database hardware.

6. The medium of claim 2 wherein said first performance point and said second performance point each comprise a network throughput speed.

7. The medium of claim 2 wherein said neural network is a perceptron.

8. The medium of claim 7 wherein said perceptron utilizes a hard-limit transfer function.

9. The medium of claim 7 wherein said perceptron comprises a multi-layer neural network.

10. The medium of claim 7 wherein said perceptron uses a learning rule formula $W^{new}=W^{old}+ep^T$ and $b^{new}=b^{old}+e$, where $e=t-a$.

11. The medium of claim 2 further comprising a website portal for providing said at least one recommended resource output result.

12. The medium of claim 2 further comprising a website portal wherein said website portal is configured to provide said at least one recommended resource output result via a webservice XML response.

13. The medium of claim 2 further comprising a website portal configured to obtain ongoing output results from at least one customer installation over a period of time.

14. The medium of claim 2 further comprising a website portal configured to obtain ongoing output results from at least one customer installation and report a high utilization to a customer.

15. A method, comprising:
  initiating, by a test server, a neural network configured to recommend resource purchases for a desired installation;
  automatically generating, by the test server, a plurality of resource output results, wherein each resource output result is generated by automatically loading a test database application with a test schema and automatically running a performance load on said test database application loaded with said test schema;
  automatically modifying, by the test server, said neural network by training said neural network using said plurality of resource output results as training data;
  automatically obtaining, by the test server, at least one database application parameter for said desired installation, wherein the test server is able to process multiple types of database application parameters including all of: a number of database records, a number of database lookups, a number of images in a database, a number of BLOBs, a number of PDF files stored in a database, a number of database fields, and a width of a plurality of database fields; and
  automatically obtaining, by the test server, at least one recommended resource output result from said neural network based on said at least one database application parameter, wherein said at least one recommended resource output result is a recommended resource purchase for said desired installation.

16. A system, comprising:
a processor executing a neural network;
a test schema database; and
a test server coupled to the neural network and test schema database, wherein the test server is to:
  automatically generate a plurality of resource output results, wherein each resource output result is generated by automatically loading a test database application with a test schema from the test schema database and automatically run a performance load on said test database application loaded with said test schema;
  automatically modify the neural network by training the neural network using the plurality of resource output results as training data;
  automatically obtain at least one database application parameter for a desired installation, wherein the test server is able to process multiple types of database application parameters including all of: a number of database records, a number of database lookups, a number of images in a database, a number of BLOBs, a number of PDF files stored in a database, a number of database fields, and a width of a plurality of database fields; and
  automatically obtain at least one recommended resource output result from the neural network based on the at least one database application parameter, wherein the at least one recommended resource output result is a recommended resource purchase for the desired installation.

* * * * *